(12) United States Patent
Yokota et al.

(10) Patent No.: US 11,374,445 B2
(45) Date of Patent: Jun. 28, 2022

(54) STATOR UNIT OF ROTARY ELECTRIC MACHINE

(71) Applicant: HONDA MOTOR CO., LTD., Tokyo (JP)

(72) Inventors: Hirotaka Yokota, Saitama (JP); Manabu Sakurada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 169 days.

(21) Appl. No.: 16/672,680

(22) Filed: Nov. 4, 2019

(65) Prior Publication Data

US 2020/0153292 A1 May 14, 2020

(30) Foreign Application Priority Data

Nov. 9, 2018 (JP) .............................. JP2018-211722

(51) Int. Cl.
*H02K 1/20* (2006.01)
*H02K 9/193* (2006.01)
*H02K 1/18* (2006.01)

(52) U.S. Cl.
CPC .............. *H02K 1/20* (2013.01); *H02K 1/185* (2013.01); *H02K 9/193* (2013.01)

(58) Field of Classification Search
CPC ................................... H02K 9/193; H02K 1/20
See application file for complete search history.

(56) References Cited

U.S. PATENT DOCUMENTS

| 4,959,570 | A | * | 9/1990 | Nakamura | H02K 9/20 310/54 |
| 5,220,233 | A | * | 6/1993 | Birch | H02K 1/2733 310/156.28 |
| 5,712,517 | A | * | 1/1998 | Schmidt | H01L 25/112 257/E25.025 |
| 2011/0180239 | A1 | | 7/2011 | Sugimoto et al. | |

(Continued)

FOREIGN PATENT DOCUMENTS

| JP | 2010263715 A | * | 11/2010 | ............ B60L 3/0061 |
| JP | 2011-155811 A | | 8/2011 | |

(Continued)

OTHER PUBLICATIONS

Miyagawa (JP 2010263715 A) English Translation (Year: 2010).*

(Continued)

*Primary Examiner* — Tulsidas G Patel
*Assistant Examiner* — Robert E Mates
(74) *Attorney, Agent, or Firm* — Paratus Law Group, PLLC

(57) ABSTRACT

A stator unit of a rotary electric machine, which includes a stator including a stator core in which a plurality of slots are formed at predetermined intervals in a circumferential direction; and a stator coil inserted into the slots and having a coil end portion protruding from at least one end surface of the stator core; a stator holder disposed to surround an outer peripheral surface of the stator core and supporting the stator; and a refrigerant guide portion disposed above the coil end portion and configured to supply a first refrigerant to the coil end portion. The refrigerant guide portion protrudes from an end surface of the stator holder to above the coil end portion and is integrally formed with the stator holder.

3 Claims, 2 Drawing Sheets

(56) References Cited

U.S. PATENT DOCUMENTS

| | | | |
|---|---|---|---|
| 2014/0241865 A1 | 8/2014 | Arimatsu | |
| 2015/0028714 A1* | 1/2015 | Matsuoka | H02K 3/12 |
| | | | 310/198 |
| 2015/0207387 A1 | 7/2015 | Kudose | |
| 2016/0322876 A1 | 11/2016 | Horii et al. | |
| 2018/0287452 A1* | 10/2018 | Kim | H02K 5/20 |

FOREIGN PATENT DOCUMENTS

| | | | |
|---|---|---|---|
| JP | 2014-166067 A | | 9/2014 |
| JP | 2014225969 A | * | 12/2014 |
| JP | 2015-139318 A | | 7/2015 |
| WO | WO 2015/107679 A1 | | 7/2015 |

OTHER PUBLICATIONS

Tachikawa (JP 2014225969 A) English Translation (Year: 2014).*
Aug. 18, 2020 Japanese Office Action issued for related JP application No. 2018-211722.

* cited by examiner

STATOR UNIT OF ROTARY ELECTRIC MACHINE

CROSS-REFERENCE TO RELATED APPLICATIONS

This application is based on and claims priority under 35 USC 119 from Japanese Patent Application No. 2018-211722 filed on Nov. 9, 2018.

TECHNICAL FIELD

The present invention relates to a stator unit of a rotary electric machine.

BACKGROUND ART

Conventionally, vehicles equipped with rotary electric machines as power sources such as electric vehicles and hybrid vehicles have been developed. In recent years, a rotary electric machine for driving has a higher output, and the performance of the rotary electric machine is deteriorated as the temperature of the stator coil increases, so that measures such as cooling of the stator coil have been studied.

In the stator unit of a rotary electric machine of JP-A-2011-155811, a refrigerant guide portion having a drip hole is disposed above a coil end portion.

However, in the stator unit of the rotary electric machine described in JP-A-2011-155811, there is a problem that the number of components is increased since a bolt which fixes the refrigerant guide portion to the stator core is required. In addition, in order to fix the refrigerant guide portion to the end surface of the stator core with a bolt, there is a problem that the stator core is enlarged in the radial direction by the length of the protruding portion through which the bolt passes.

SUMMARY

An aspect of the present invention provides a stator unit of a rotary electric machine which can reduce the number of components and can be reduced in size.

An embodiment of the present invention relates to a stator unit of a rotary electric machine which includes:

a stator including a stator core in which a plurality of slots are formed at predetermined intervals in a circumferential direction and a stator coil inserting into the slots and having a coil end portion protruding from at least one end surface of the stator core;

a stator holder disposed to surround an outer peripheral surface of the stator core and supporting the stator; and a refrigerant guide portion disposed above the coil end portion and supplying a first refrigerant to the coil end portion, the refrigerant guide portion protrudes from an end surface of the stator holder to above the coil end portion and is integrally formed with the stator holder According to the above embodiment of the present invention, since a refrigerant guide portion and a stator holder are integrally formed, a fixing member which fixes the stator holder and the refrigerant guide portion is not required, and the number of components can be reduced. Further, since there is no need to provide a fixing portion for fixing the refrigerant guide portion on the end surface of the stator holder, the stator unit can be reduced in size in a radial direction.

DESCRIPTION OF EMBODIMENTS

Hereinafter, an embodiment of a stator unit of a rotary electric machine according to the present invention will be described with reference to the accompanying drawings.
[Configuration of Stator Unit]

Figure 1:
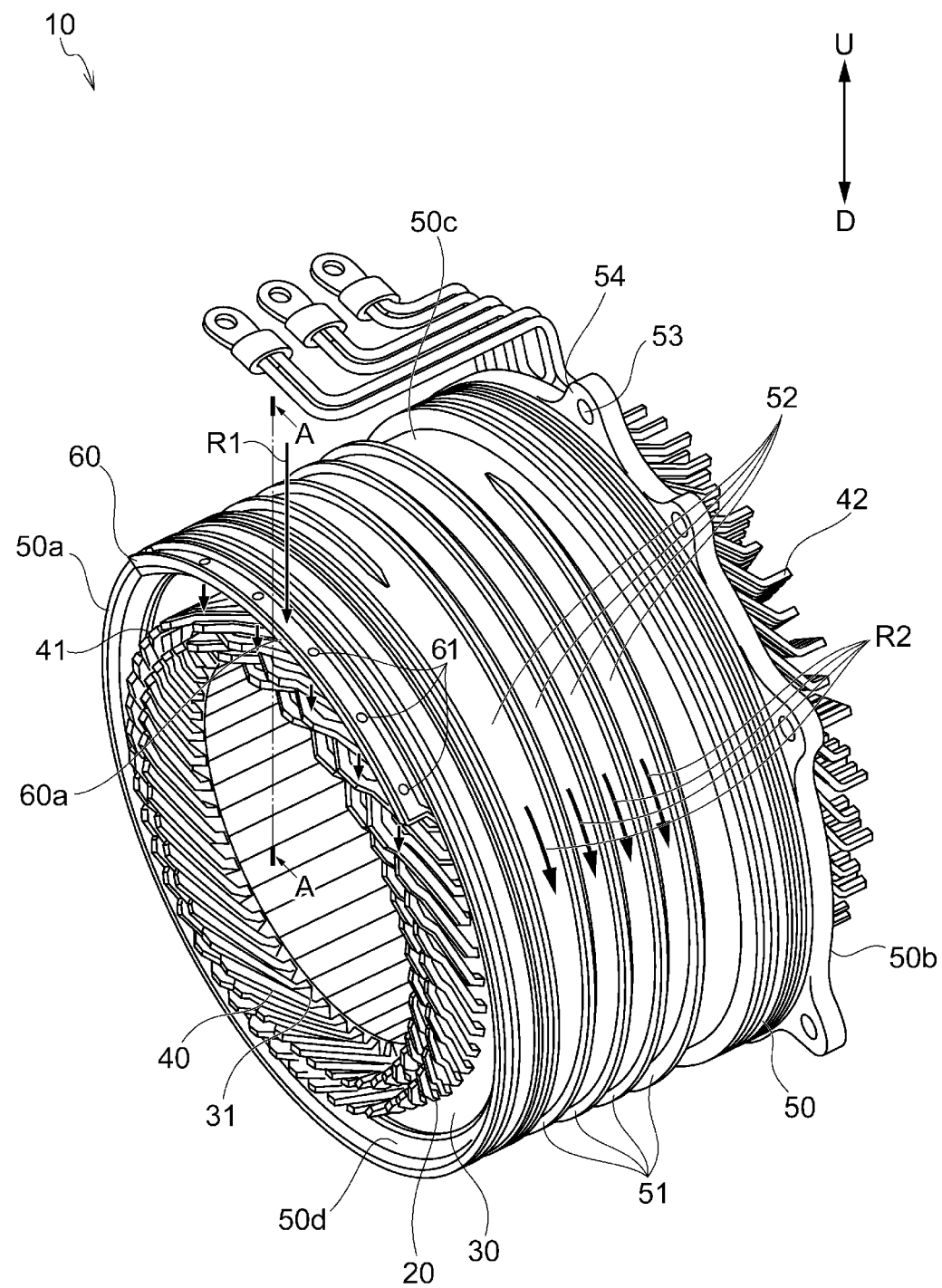
FIG. 1 is a perspective view of a stator unit of a rotary electric machine according to an embodiment of the present invention.

As shown in FIG. 1, a stator unit 10 of the rotary electric machine according to the present embodiment includes a stator 20, a stator holder 50, and a refrigerant guide portion 60. A rotor (not shown) is rotatably disposed inside the stator 20.

In the following description, the "axial direction", the "circumferential direction", and the "radial direction" are defined based on the axial center of the stator 20 (rotary electric machine). Further, "upper" and "lower" are defined based on the vertical direction of the stator unit 10 in use. In the drawings, an upper side of the stator unit 10 is indicated by U and a lower side as D, respectively.

The stator 20 has a substantially cylindrical shape, and includes a stator core 30 in which a plurality of slots 31 passing through the axial direction are formed at predetermined intervals along the circumferential direction, and a stator coil 40 having a plurality of phases (for example, a U-phase, a V-phase, and a W-phase) inserted into the slots 31. The stator coil 40 includes a first coil end portion 41 and a second coil end portion 42 protruding from end surfaces of both sides of the stator core 30 in the axial direction.

The stator holder 50 is disposed to surround the outer peripheral surface of the stator core 30, and has a substantially cylindrical shape for supporting the stator 20. The stator holder 50 includes a first end surface 50a and a second end surface 50b having a substantially annular shape and positioned on both sides in the axial direction, and an outer peripheral surface 50c and an inner peripheral surface 50d having a substantially cylindrical surface shape. The outer peripheral surface 50c of the stator holder 50 is provided with a convex wall 51 protruding radially outward. The convex wall 51 has a spiral shape that makes a plurality of turns at a predetermined interval from the first end surface 50a side toward the second end surface 50b side.

Figure 2:
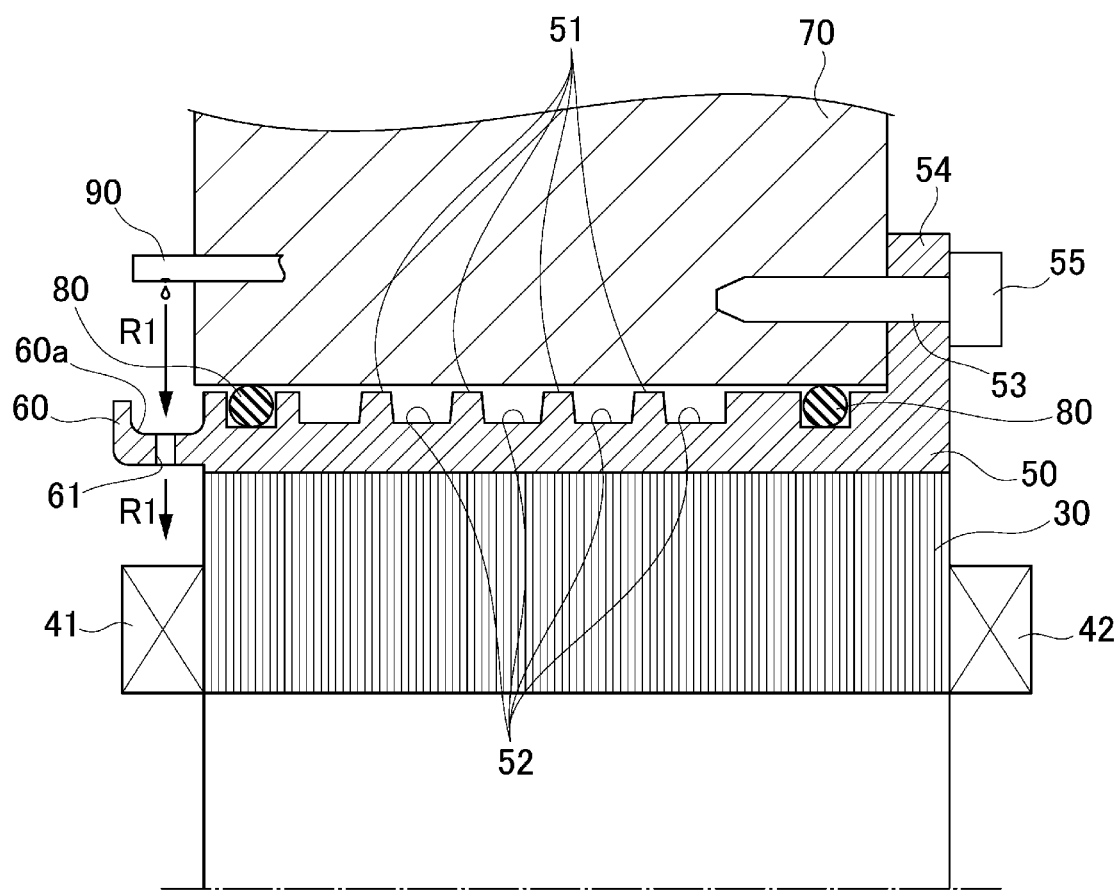
FIG. 2 is a cross-sectional view taken along line A-A in a state in which the stator unit of the rotary electric machine of FIG. 1 is fixed to a housing.

As shown in FIGS. 1 and 2, a housing 70 is provided to surround the outer peripheral surface 50c of the stator holder 50. In a space between the outer peripheral surface 50c of the stator holder 50 and the housing 70, a refrigerant flow path 52 partitioned by the convex wall 51 extending in the spiral shape is formed. A pair of seal members 80 for sealing a space between the outer peripheral surface 50c of the stator holder 50 and the housing 70 is provided on the first end surface 50a side and the second end surface 50b side of the outer peripheral surface 50c of the stator holder 50. Therefore, the refrigerant flow path 52 is sealed by the pair of seal members 80.

The second end surface 50b of the stator holder 50 is provided with a plurality of fastening portions 54 protruding radially outward from the outer peripheral surface 50c and having insertion-through holes 53 passing therethrough in the axial direction. The fastening member 55 is inserted into the insertion-through hole 53, and the stator unit 10 is fixed to the housing 70 by screwing the fastening member 55 into the housing 70.

The refrigerant guide portion 60 protrudes upward from the first end surface 50*a* of the stator holder 50 in the axial direction above the first coil end portion 41 of the stator coil 40. The refrigerant guide portion 60 has a substantially arc shape formed along the outer periphery of the first end surface 50*a* of the stator holder 50 and the first coil end portion 41 of the stator coil 40. The refrigerant guide portion 60 has a bottom surface 60*a* in a shape that is recessed in a circumferential direction so that a first refrigerant R1 described later can be stored. The refrigerant guide portion 60 includes drip holes 61 that pass through the bottom surface 60*a* in a radial direction formed at a predetermined interval along the circumferential direction. In the present embodiment, the drip hole 61 is a round hole, but may be a rectangular slit hole, and can be made into optional shapes.

The stator holder 50 and the refrigerant guide portion 60 are integrally formed of a metal member. Accordingly, a fixing member which fixes the stator holder 50 and the refrigerant guide portion 60 is not required, and a number of components can be reduced. Further, since there is no need to provide a fixing portion for fixing the refrigerant guide portion 60 on the first end surface 50*a* of the stator holder 50, the thickness of the first end surface 50*a* in the radial direction can be reduced, and the stator holder 50 can be reduced in size in the radial direction.

[Stator Cooling]

A first refrigerant supply portion 90 for supplying the first refrigerant R1 to the refrigerant guide portion 60 is provided above the stator unit 10. The first refrigerant supply portion 90 is, for example, a tubular member protruding axially from the housing 70 and disposed above the refrigerant guide portion 60. The first refrigerant R1 is, for example, automatic transmission fluid (ATF). The first refrigerant R1 is supplied to the refrigerant guide portion 60 by being discharged downward from the first refrigerant supply portion 90, and is stored in the refrigerant guide portion 60. The first refrigerant R1 stored in the refrigerant guide portion 60 drips from the drip hole 61 provided in the bottom surface 60*a* of the refrigerant guide portion 60 to the first coil end portion 41 of the stator coil 40, and cools the stator coil 40.

In this way, since the refrigerant guide portion 60 includes the plurality of drip holes 61 in the bottom surface 60*a* and the first refrigerant R1 is dropped from the drip holes 61, the first refrigerant R1 can be supplied to the first coil end portion 41 with a simple structure. Further, since the refrigerant guide portion 60 has a substantially arc shape formed along the outer periphery of the first coil end portion 41 of the stator coil 40, the distance between the refrigerant guide portion 60 and the first coil end portion 41 can be shortened, and the first refrigerant R1 can be reliably supplied to the first coil end portion 41.

A second refrigerant R2 different from the first refrigerant R1 is supplied from a second refrigerant supply device (not illustrated) to the first end surface 50*a* side or the second end surface 50*b* side of the spiral refrigerant flow path 52. The second refrigerant R2 is, for example, water. The second refrigerant R2 supplied to the first end surface 50*a* side or the second end surface 50*b* side of the refrigerant flow path 52 passes through the spiral refrigerant flow path 52 and cools the stator core 30 through the stator holder 50, and is discharged from the second end surface 50*b* side or the first end surface 50*a* side of the refrigerant flow path 52 on the side opposite to the side where the second refrigerant is supplied.

Here, since the stator holder 50 and the refrigerant guide portion 60 are integrally formed of a metal member having a high thermal conductivity, heat exchange between the second refrigerant R2 flowing through the refrigerant flow path 52 formed in the outer peripheral surface 50*c* of the stator holder 50 and the first refrigerant R1 stored in the refrigerant guide portion 60 is promoted.

In the present embodiment, the temperature of the second refrigerant R2 is lower than the temperature of the first refrigerant R1. Therefore, the stator holder 50 is cooled by the second refrigerant R2, the refrigerant guide portion 60 is cooled by cooling the stator holder 50, and the first refrigerant R1 is cooled by cooling the refrigerant guide portion 60. Accordingly, the cooled first refrigerant R1 can be supplied to the first coil end portion 41 of the stator coil 40, and the stator coil 40 can be effectively cooled.

Further, the present invention is not limited to the above-described embodiment and may be appropriately modified, improved, or the like.

For example, in the present embodiment, the convex wall 51 has a spiral shape that makes a plurality of turns at a predetermined interval from the first end surface 50*a* side toward the second end surface 50*b* side, but may have a shape extending substantially linearly in the axial direction alternately from the first end surface 50*a* side and the second end surface 50*b* side, for example. In this way, along the outer peripheral surface 50*c* of the stator holder 50, the refrigerant flow path 52 in which the refrigerant flows alternately from the first end surface 50*a* side to the second end surface 50*b* side and from the second end surface 50*b* to the first end surface 50*a* side is formed.

Further, at least the following matters are described in the present specification. Corresponding components in the above-described embodiments are shown in parentheses, without being limited thereto.

(1) A stator unit of a rotary electric machine which is a stator unit of a rotary electric machine (stator unit 10) including: a stator (stator 20) including a stator core (stator core 30) in which a plurality of slots (slots 31) are formed at predetermined intervals in the circumferential direction and a stator coil (stator coil 40) inserted into the slots and having a coil end portion (first coil end portion 41) protruding from at least one end surface of the stator core;

a stator holder (stator holder 50) disposed to surround an outer peripheral surface of the stator core and supporting the stator; and a refrigerant guide portion (refrigerant guide portion 60) disposed above the coil end portion and configured to supply a first refrigerant (first refrigerant R1) to the coil end portion, wherein the refrigerant guide portion protrudes from an end surface (first end surface 50*a*) of the stator holder to above the coil end portion and is integrally formed with the stator holder.

According to (1), since the refrigerant guide portion and the stator holder are integrally formed, a fixing member for fixing the stator holder and the refrigerant guide portion is not required, and the number of components can be reduced. Further, since there is no need to provide a fixing portion for fixing the refrigerant guide portion on the end surface of the stator holder, the stator unit can be reduced in size in a radial direction.

(2) In the stator unit of a rotary electric machine according to (1), the stator holder and the refrigerant guide portion are integrally formed of a metal member, and a refrigerant flow path (refrigerant flow path 52) through which a second refrigerant (second refrigerant R2) different from the first refrigerant flows is formed on an outer peripheral surface (outer peripheral surface 50c) of the stator holder.

According to (2), since the stator holder and the refrigerant guide portion are integrally formed by the metal member having a high thermal conductivity, heat exchange between the second refrigerant flowing through the refrigerant flow path formed on the outer peripheral surface of the stator holder and the first refrigerant flowing through the refrigerant guide portion is promoted.

(3) In the stator unit of the rotary electric machine according to (2), a temperature of the second refrigerant is lower than a temperature of the first refrigerant.

According to (3), since the temperature of the second refrigerant is lower than the temperature of the first refrigerant, the refrigerant guide portion is cooled by the second refrigerant via the stator holder, so that the first refrigerant can be cooled. Accordingly, the cooled first refrigerant can be supplied to the coil end portion, and the stator coil can be effectively cooled.

(4) In the stator unit of the rotary electric machine according to any one of (1) to (3), the refrigerant guide portion is formed along an outer periphery of the coil end portion.

According to (4), since the refrigerant guide portion is formed along the outer periphery of the coil end portion, the distance between the refrigerant guide portion and the coil end portion can be shortened, and the first refrigerant can be reliably supplied to the coil end portion.

(5) In the stator unit of the rotary electric machine according to any one of (1) to (4), the refrigerant guide portion includes a plurality of drip holes (drip holes 61) on a bottom surface (bottom surface 60a) thereof, and the first refrigerant is dropped from the drip hole to supply the first refrigerant to the coil end portion.

According to (5), since the refrigerant guide portion includes a plurality of drip holes on the bottom surface and the first refrigerant is dropped from the drip hole, the first refrigerant is supplied to the coil end portion, so that the first refrigerant can be supplied to the coil end portion with a simple structure.

The invention claimed is:

1. A stator unit of a rotary electric machine, comprising:
a stator including:
a stator core in which a plurality of slots are formed at predetermined intervals in a circumferential direction; and
a stator coil inserted into the slots and having a coil end portion protruding from at least one end surface of the stator core;
a housing;
a stator holder disposed to surround an outer peripheral surface of the stator core and supporting the stator; and
a refrigerant guide portion disposed above the coil end portion, formed along an outer periphery of the coil end portion, including a plurality of drip holes on a bottom surface thereof, and configured to supply a first refrigerant to the coil end portion,
wherein the refrigerant guide portion protrudes from an end surface of the stator holder to above the coil end portion and is integrally formed with the stator holder, and the refrigerant guide portion protrudes upward from the stator holder and extends outward from the coil end portion and from the end surface of the stator holder to form a recessed portion for storing the first refrigerant,
wherein a refrigerant flow path through which a second refrigerant different from the first refrigerant flows is formed on an outer peripheral surface of the stator holder,
wherein the stator holder is a sleeve that is provided between the stator core and the housing, and has the refrigerant flow path formed thereon,
wherein heat exchange between the first refrigerant and the second refrigerant is performed by the stator holder and the refrigerant guide portion integrally formed with each other,
wherein the first refrigerant which flows along the outer periphery of the coil end portion and is heat exchanged is dropped to the coil end portion from the plurality of drip holes, and
wherein the refrigerant flow path extends in a spiral shape.

2. The stator unit of a rotary electric machine according to claim 1, wherein
the stator holder and the refrigerant guide portion are integrally formed of a metal member.

3. The stator unit of a rotary electric machine according to claim 1, wherein
a temperature of the second refrigerant is lower than a temperature of the first refrigerant.

* * * * *